US009181982B2

(12) United States Patent
Lindholst et al.

(10) Patent No.: US 9,181,982 B2
(45) Date of Patent: Nov. 10, 2015

(54) BLADE BEARING WITH SUPPORT STRUCTURE HAVING NON-UNIFORM STIFFNESS AND METHOD MANUFACTURE

(71) Applicant: Vestas Wind Systems A/S, Aarhus N. (DK)

(72) Inventors: Peter Lindholst, Hinnerup (DK); Jesper Lykkegaard Neubauer, Hornslet (DK); Ole Mølgaard Jeppesen, Skjern (DK); Torben Friis Baun, Arhus (DK)

(73) Assignee: Vestas Wind Systems A/S, Aarhus N. (DK)

( * ) Notice: Subject to any disclaimer, the term of this patent is extended or adjusted under 35 U.S.C. 154(b) by 9 days.

(21) Appl. No.: 14/373,196

(22) PCT Filed: Dec. 20, 2012

(86) PCT No.: PCT/DK2012/050486
§ 371 (c)(1),
(2) Date: Jul. 18, 2014

(87) PCT Pub. No.: WO2013/107452
PCT Pub. Date: Jul. 25, 2013

(65) Prior Publication Data
US 2014/0355922 A1  Dec. 4, 2014

Related U.S. Application Data

(60) Provisional application No. 61/588,675, filed on Jan. 20, 2012.

(30) Foreign Application Priority Data

Jan. 23, 2012 (DK) ................................. 2012 70036

(51) Int. Cl.
*F16C 13/02* (2006.01)
*F16C 19/08* (2006.01)
(Continued)

(52) U.S. Cl.
CPC ............... *F16C 35/06* (2013.01); *B23P 15/003* (2013.01); *F03D 1/0658* (2013.01);
(Continued)

(58) Field of Classification Search
CPC . F03D 11/0008; F03D 1/0658; F03D 7/0224; F05B 2260/79; F16C 35/042; F16C 35/045; F16C 35/067
USPC .................... 384/512, 537, 544; 416/147, 174
See application file for complete search history.

(56) References Cited

U.S. PATENT DOCUMENTS

2009/0311104 A1  12/2009 Steffensen
2013/0177419 A1*  7/2013 Zaehr .................... F03D 7/0224
                                                  416/23

FOREIGN PATENT DOCUMENTS

EP      1596064 A2   11/2005
EP      1959129 A2    8/2008
(Continued)

OTHER PUBLICATIONS

International Searching Authority, International Search Report and Written Opinion issued in corresponding PCT Application No. PCT/DK2012/050486 dated Apr. 9, 2013, 12 pages.
(Continued)

*Primary Examiner* — Phillip A Johnson
(74) *Attorney, Agent, or Firm* — Wood, Herron & Evans, LLP

(57) ABSTRACT

A blade bearing for mounting a blade of a wind turbine to a hub of the wind turbine comprises inner and outer rings arranged next to each other. One of the inner and outer rings is configured to mount to the blade, and the other is configured to mount to the hub. At least two rows of rolling elements are positioned between the inner and outer rings. Upper and lower rows of the rolling elements are located in respective upper and lower planes. A support structure is secured to the inner ring and extends in a substantially radial direction between the upper and lower planes. The support structure has non-uniform stiffness characteristics in a circumferential direction. A method of manufacturing a blade bearing is also provided.

16 Claims, 4 Drawing Sheets

(51) Int. Cl.
*F16C 43/04* (2006.01)
*F16C 35/06* (2006.01)
*F03D 11/00* (2006.01)
*F03D 1/06* (2006.01)
*B23P 15/00* (2006.01)
*F16C 19/28* (2006.01)

(52) U.S. Cl.
CPC ............ *F03D 11/0008* (2013.01); *F16C 19/08* (2013.01); *F16C 19/28* (2013.01); *F16C 43/04* (2013.01); *F05B 2230/60* (2013.01); *F05B 2260/79* (2013.01); *F05B 2280/702* (2013.01); *F16C 2202/06* (2013.01); *Y02E 10/721* (2013.01); *Y02E 10/722* (2013.01); *Y10T 29/49684* (2015.01)

(56) References Cited

FOREIGN PATENT DOCUMENTS

| | | |
|---|---|---|
| EP | 2078855 A1 | 7/2009 |
| WO | 2004007954 A1 | 1/2004 |
| WO | 2007003866 A1 | 1/2007 |

OTHER PUBLICATIONS

Danish Patent and Trademark Office, Search report issued in corresponding DK application No. PA 2012 70036 dated Aug. 30, 2012, 1 page.

\* cited by examiner

BLADE BEARING WITH SUPPORT STRUCTURE HAVING NON-UNIFORM STIFFNESS AND METHOD MANUFACTURE

TECHNICAL FIELD

The present invention relates to blade bearings for wind turbines and methods of manufacturing such bearings.

BACKGROUND

Wind turbines typically include a rotor with large blades driven by the wind. The blades convert the kinetic energy of the wind into rotational mechanical energy. The mechanical energy is typically transferred via drivetrain to a generator, which then converts the energy into electrical power.

Most modern wind turbines control power output by pitching the blades relative to the wind. Thus, each blade is mounted to a hub by a blade bearing that allows relative movement between the blade and the hub. The blades are rotated about their longitudinal axis by a pitch system that includes one or more electrical drives (e.g., electrical motors) or hydraulic drives (e.g., hydraulic actuators).

Pitch control places significant demands on the blade bearings because they are subjected to a high level of activity. The small, cyclical movements that characterize pitch control can reduce fatigue life. As a result, various approaches have been taken to increase the load capacity of blade bearings.

One of the most conventional approaches is to include two or more rows of rolling elements (e.g., balls or rollers). Two-row ball bearings are often used as blade bearings, and three-row ball bearings and three-row roller bearings have drawn increased interest in recent years as the size (and loads) of wind turbines has grown.

The additional rows of rolling elements, however, may still not be sufficient to meet design loads. The blade bearings may still experience distortions that affect their capacity. Furthermore, the additional rows can lead to problems of load distribution. One option to address these challenges is to increase the size and weight of the blade bearings, but this can lead to a significant increase in costs. Not only for the blade bearings themselves, but also for the blade and hub which must increase in size to accommodate the blade bearings.

Another option is to stiffen the rings of the blade bearings with an additional support structure, such as a plate. Such plates are mounted on one or both sides of a bearing ring, particularly the inner ring. Although reinforcing the inner ring on both sides may keep radial distortions low, it can also limit deflections in the axial direction. This may lead to high contact angles for the rolling elements and poor load distribution when the outer ring deflects in the axial direction (effectively tilting relative to the inner bearing ring).

SUMMARY

A blade bearing for mounting a blade of a wind turbine to a hub of the wind turbine is described below. The blade bearing comprises inner and outer rings arranged next to each other, with one of the inner and outer rings being configured to mount to the blade and the other being configured to mount to the hub. At least two rows of rolling elements are positioned between the inner and outer rings. Upper and lower rows of the rolling elements are located in respective upper and lower planes. The blade bearing also includes a support structure secured to the inner ring and extending in a substantially radial direction between the upper and lower planes. There are particular advantages described below associated with such an arrangement, at least in the region where the support structure interfaces with the inner ring. The entire support structure need not, however, be confined between the upper and lower rows of the rolling elements to provide the advantages.

As an additional feature, the support structure has non-uniform stiffness characteristics in a circumferential direction (different portions of the support structure at the same radial distance from its center have different stiffness characteristics). The non-uniform stiffness characteristics may be provided, for example, by one or more portions of increased thickness. Particular advantages are obtained when the portions correspond to angular sectors where the blade is heavily loaded.

A corresponding method of manufacturing a blade bearing for a wind turbine is also provided. The method comprises forming the inner and outer rings, securing the support structure to the inner ring before the inner and outer rings are assembled together, and machining a raceway surface on the inner ring after securing the support structure. The raceway surface is configured to support the rows of rolling elements. Thus, at some point after securing the support structure and machining the inner ring, the rows of rolling elements are arranged on the raceway surface. The inner and outer rings are then arranged next to each other so that the rows of rolling elements are held between the inner and outer rings.

As a further aspect of the invention, the support structure is cast from a first material and the inner and outer rings are formed from a second material. The advantages associated with this and the blade bearing in general will be more apparent based on the description below.

DETAILED DESCRIPTION

Figure 1:
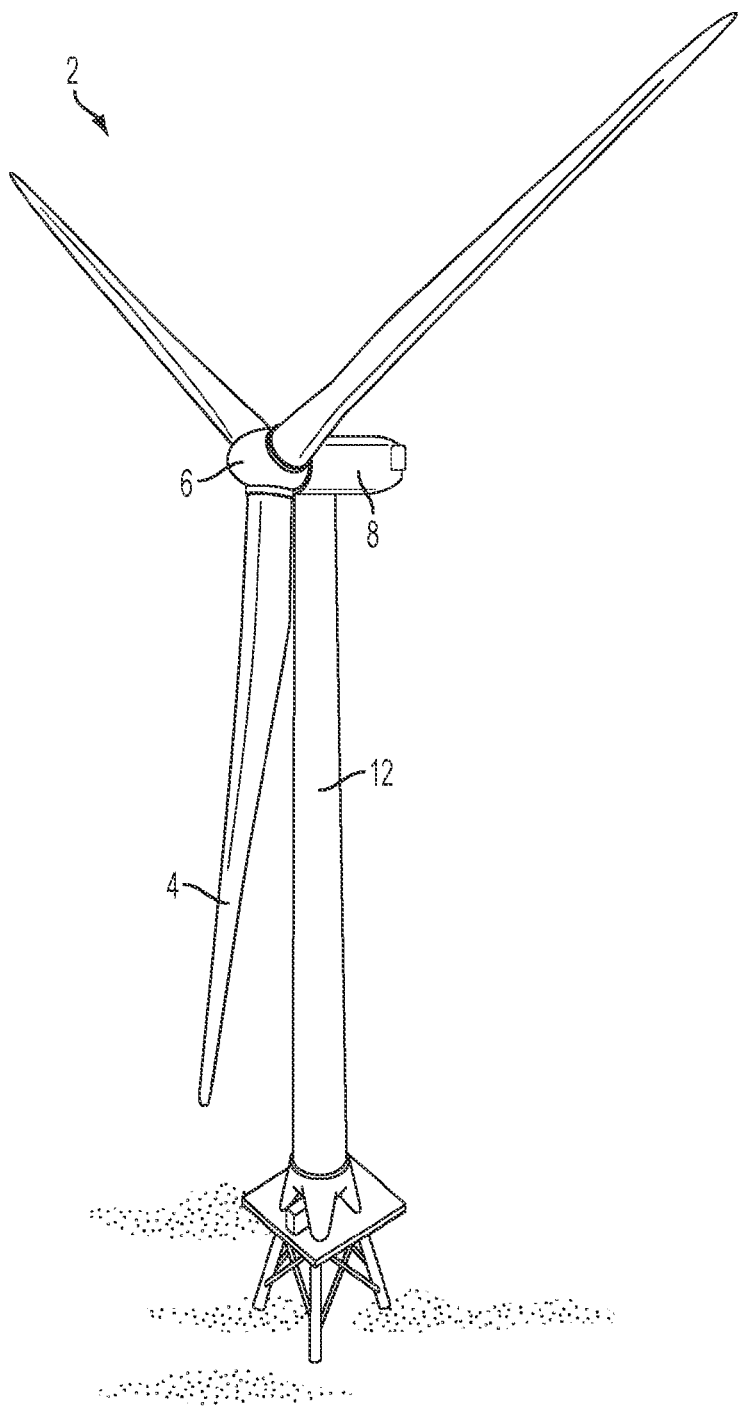
FIG. 1 is a perspective view of an example of a wind turbine.

FIG. 1 shows one example of a wind turbine 2. The wind turbine 2 includes a rotor having blades 4 mounted to a hub 6, which is supported by a nacelle 8 on a tower 12. Although an offshore wind turbine is shown, it should be noted that the description below may be applicable to other types of wind turbines. Indeed, the description below focuses on particular component common to most wind turbines, namely blade bearings for mounting the blades 4 to the hub 6.

Figure 2:
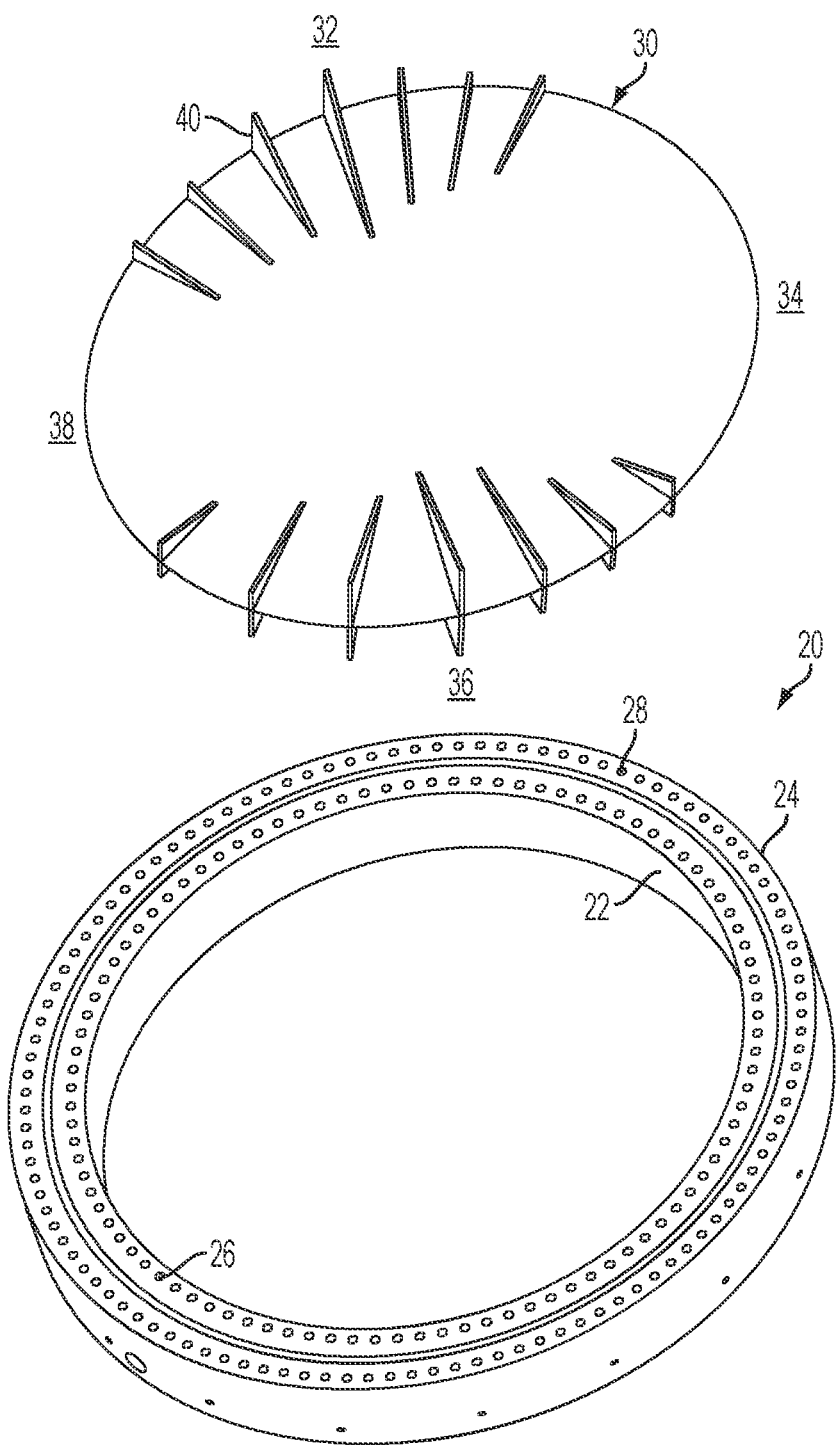
FIG. 2 is an exploded perspective view of a blade bearing for a wind turbine.
Figure 3:
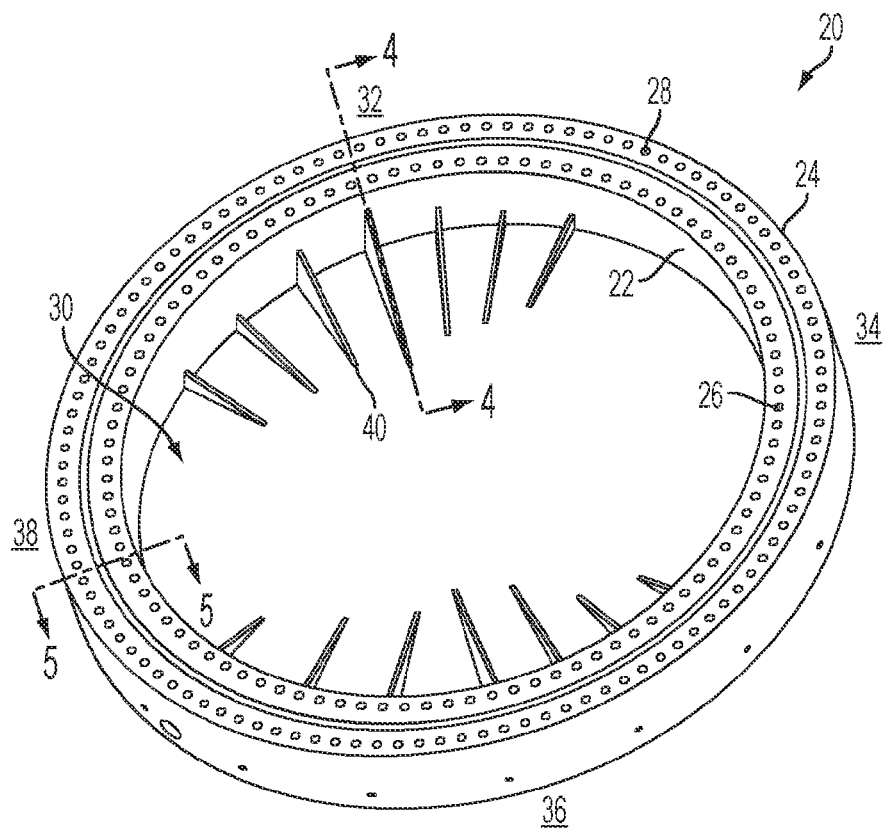
FIG. 3 is a perspective view of the blade bearing shown in FIG. 2.

FIGS. 2 and 3 illustrate one example of a blade bearing 20 according to the invention. The blade bearing includes inner and outer rings 22, 24 arranged next each other. The inner ring 22 is configured to mount to the blade via bolts (not shown) extending through bolt holes 26. The outer ring 24 is configured to mount to the hub via bolts (not shown) extending through bolt holes 28. At least two rows of rolling elements (e.g., balls or rollers; not shown) are positioned between the inner and outer rings 22, 24.

The blade bearing 20 also includes a support structure 30 secured to the inner ring 22. The support structure 30 is shown as a plate-like member covering an opening defined by the inner ring 22, although it may alternatively be annular or have some other shape. The manner in which the support structure 30 and inner ring 22 are secured may also vary. Some possibilities include shrink fitting and clamping, although other methods of joining and mechanical fastening will be appreciated. The support structure 30 may even be casted around or within a portion of the inner ring 22 if different materials are used. Regardless, the support structure 30 can be positioned between upper and lower surfaces of the inner ring 22 using these techniques. In other words, unlike the prior art where support structures are mounted to one or both sides of a bearing ring, the support structure 30 is arranged somewhere between the sides. This will be described in further detail below. Moreover, this arrangement may be achieved without bolts extending radially into the inner ring 22 such that additional bearing material is not required to accommodate the connection. Although bolting remains a possibility, preferably the inner ring 22 and support structure 30 are secured together during the bearing production process using one of the above-mentioned techniques.

The support structure 30 may have non-uniform stiffness characteristics in a circumferential direction. That is, different portions of the support structure 30 at the same radial distance from its center may have different stiffness characteristics (radially, angularly, and/or axially). This may be achieved, for example, by providing the support structure 30 with one or more portions of increased thickness at strategically-selected locations. In the embodiment shown in the figures and discussed below, the portions of increased thickness are defined by different support ribs 40. However, other ways of designing the support structure 30 with different stiffness characteristics at different locations will be appreciated by skilled persons in the technical field of the invention.

The support ribs 40 are sized and arranged so that the support structure 30 has increased radial, angular, and axial stiffness in certain portions (angular sectors) of the blade bearing 20. For example, first, second, third, and fourth portions are generally noted in FIG. 2 at 32, 34, 36, and 38, respectively. The first and third portions 32, 36 have a greater stiffness than the second and fourth portions 34, 38 due to the support ribs 40.

Figure 3A:
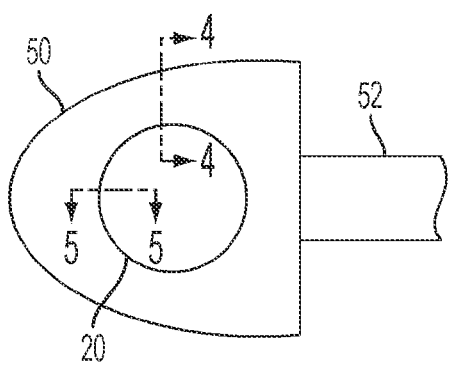
FIG. 3A is a schematic view of the blade bearing in relation to other components of the wind turbine.
Figure 4:
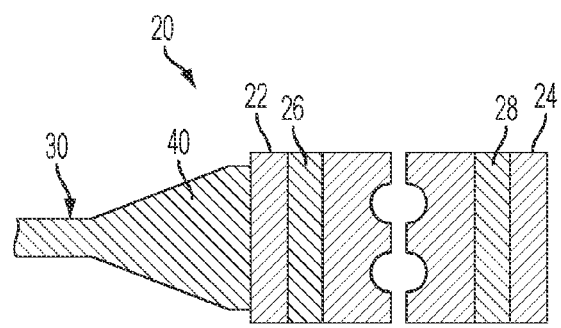
FIG. 4 is a cross-sectional view taken along line 4-4 in FIG. 3.

Advantageously, the first and third portions 32, 36 are diametrically opposite and generally aligned with the edgewise direction of the blades when the wind turbine is producing power. This can best be seen with reference to FIGS. 3, 3A, and 4. FIG. 3A schematically illustrates the blade bearing 20 in relation to a hub 50 and main shaft 52 of the wind turbine, and FIG. 4 is a cross-section through the blade bearing 20 at the first portion 32. Bolts connecting the inner ring 22 to a blade are continuously placed in tension and compression as the rotor rotates. As will be appreciated, the blade bearing 20 is heavily loaded at the first and third portions 32, 36 due to the significant weight of the blades. The increased stiffness provided by the support structure 30 at these locations reinforces the inner ring 22 to help prevent the inner ring 22 from moving relative to the outer ring in the axial direction (i.e., "slipping"), angular direction (i.e., "tilting"), radial direction (i.e., "ovalizing"). Poor performance due to high contact angles with the rolling elements (not shown) is therefore minimized.

The second and fourth portions 34, 38 are also diametrically opposite, but generally located at an angular distance of 90° from the first and third portions 32, 36. Accordingly, the second and fourth portions 34, 38 may be generally aligned with the flapwise direction of the blade when the rotor is rotating to produce power (see FIGS. 3A and 5). At these locations the bolts are not as heavily loaded; reinforcing the bolt connection is less of a concern. However, due to the nature of the bearing loads, the outer ring 24 may be urged to "tilt" relative to the inner ring 22. The support structure 30 is devoid of support ribs 40 at these locations such that it has a relatively lower stiffness, thereby providing the inner ring 22 with increased flexibility so that the inner ring 22 can tilt as well.

Figure 5:
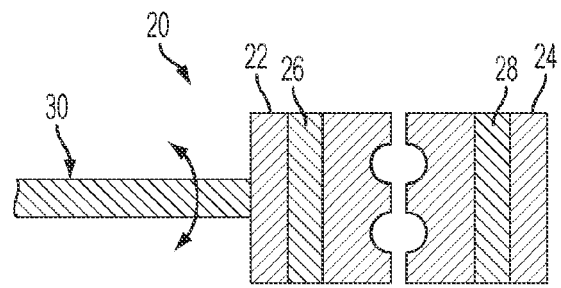
FIG. 5 is a cross-sectional view taken along line 5-5 in FIG. 3.

FIG. 5 illustrates this principle in further detail. As can be seen, the support structure 30 is arranged relative to the inner ring 22 so that the tilting results in a desired/proper load distribution between the rows of rolling elements (which are not shown). In particular, the support structure 30 extends in a substantially radial direction between the rows of rolling elements. Thus, the support structure 30 is primarily or entirely arranged between the planes in which upper and lower rows of the rolling elements are located, at least in the region where the support structure 30 meets the inner ring 22. This arrangement allows the inner ring 22 to more effectively "follow" (i.e., match) any tilting of the outer ring 24 due to the bearing loads. Adverse effects on load distribution between the rows of rolling elements when the outer ring tilts are therefore minimized.

One of the advantages associated with the blade bearing 20 is that the support structure 30 and inner ring 22 may be made from different materials. This can lead to significant cost savings. For example, bearing rings are typically made from relatively expensive alloys and subjected to various hardening and machining steps. Although this material selection and processing drives up costs, it is generally considered necessary to ensure the raceway surfaces are of sufficient quality and have the necessary fatigue resistance. The alloys are relatively soft to allow for the machining. To help prevent distortions and ensure sufficient load capacity despite the relatively soft/flexible material, the bearing rings are dimensioned accordingly.

With the blade bearing 20 described above, the material of the inner ring 22 can be kept to a minimum. Much of the loading is handled by the support structure 30, which may be cast from a cheaper alloy without significant finishing operations. The inner ring 22 need not have significant dimensions to compensate for its relatively softer material.

A particular advantage associated with casting the support structure 30 is that desired shapes may be easily produced. As mentioned above, the support ribs 40 are merely one possible way of providing the support structure 30 with a non-uniform stiffness. The same effect may be achieved by many other shapes and configurations of the support structure 30, such as increased thicknesses in the portions where increased stiffness is desired.

Figure 6:
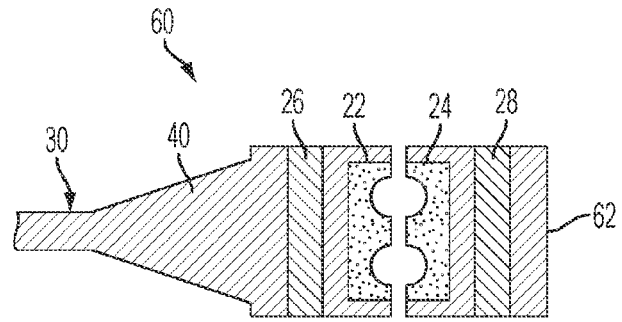
FIG. 6 is a cross-sectional view of an alternative embodiment of a blade bearing.

FIG. 6 illustrates an alternative embodiment of a blade bearing 60 that further illustrates the extent to which the support structure may help reduce material of the inner ring. The same reference numbers are used in FIG. 6 to refer to elements corresponding to those discussed above. In this embodiment, the support structure 30 even includes the bolts holes 26 for the bolted connection with the blade. The inner ring 22 is essentially reduced to an insert containing the raceway surface. The outer ring 24 may be constructed in a similar manner. That is, reduced to an insert containing the raceway surface. The insert is surrounded by a support structure 62 that results in the two-piece construction resembling a more conventional bearing ring.

Figure 7:
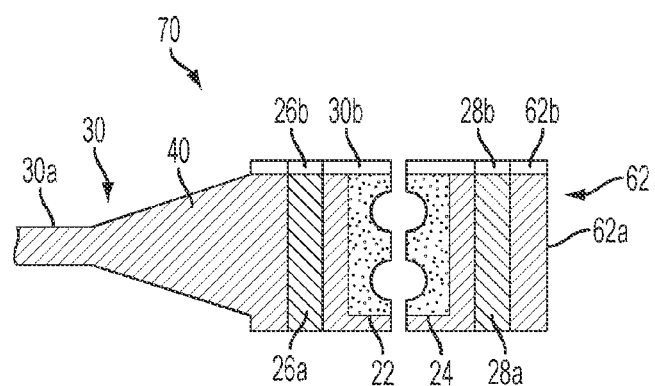
FIG. 7 is a cross-sectional view of yet another embodiment of a blade bearing.

FIG. 7 illustrates yet another embodiment of a blade bearing 70, again with the same reference numbers being used to refer to elements corresponding to those discussed above. In this embodiment, the support structure 30 comprises first and second parts 30a, 30b. The first part 30a primarily provides the intended functionalities of the support structure, namely stiffening the inner ring 22 in the manner described above. The second part 30b is used to clamp the inner ring 22 to the support structure 30. The bolt hole 26 includes first and second portions 26a, 26b extending through the respective first and second parts 30a, 30b. Thus, the first and second parts 30a, 30b may be held together using the bolts that secure the blade to the bearing. The outer ring 24 and support structure 62 may be arranged in a similar manner (i.e., the support structure 62 having first and second parts 62a, 62b to facilitate securing the outer ring 24).

A possible method of manufacturing blade bearings according to the invention (including the examples above) will now be described. The inner and outer rings are formed, but the inner ring is not machined or treated to its final form. Instead, the inner ring is first secured to the support structure. The final machining of the inner ring takes place at some point afterwards, as may other treatments. This includes machining the raceway surface on the inner ring.

The outer ring is machined and treated to its final form as well. This may occur before or after securing the support structure to the inner ring. Either way, eventually the inner and outer rings are arranged next to each other and at least two rows of rolling elements are arranged on the raceway surfaces. The rolling elements are held between the inner and outer rings.

In summary, unlike the prior art where bearings are first produced by a manufacturer and support structures are auxiliary components attached by a downstream user/customer, the support structure is provided as part of the bearing production process. This helps make it possible to further reduce the material of the inner ring, as the support structure provides additional reinforcement during the final machining.

The embodiments described above are merely examples of the invention defined by the claims that appear below. Those skilled in the design of wind turbine bearings will appreciate additional examples, modifications, and advantages based on the description. For example, although a two-row ball bearing is shown and described, a blade bearing according to the invention may alternatively be a three-row ball bearing, three-row roller bearing, or even a three-ring bearing with multiple rows of rolling elements. In the latter type of bearing, the terms "inner ring" and "outer ring" are relative terms such that the term "outer ring" in the claims below may refer to the middle ring instead of the outermost ring. Moreover, although the inner and outer rings 22, 24 are described as being configured to mount to the blade and hub, respectively, in alternative embodiments the arrangement may be reversed. The inner ring may be configured to mount to the hub and the outer ring may be configured to mount to the blade. Furthermore, although the advantages of casting the support structure are mentioned above, it is also possible to machine the support structure from a non-casted component.

With this in mind, the details of any particular embodiment should not be seen to necessarily limit the scope of the claims below. In addition to appreciating other modifications and variations, skilled persons will understand how features of the various embodiments may be combined in different ways.

The invention claimed is:

1. A blade bearing for mounting a blade of a wind turbine to a hub of the wind turbine, comprising:
    inner and outer bearing rings arranged next to each other, one of the inner and outer bearing rings being configured to mount to the blade and the other being configured to mount to the hub;
    at least two rows of rolling elements positioned between the inner and outer bearing rings, wherein upper and lower rows of the rolling elements are located in respective upper and lower planes; and
    a support structure secured to the inner bearing ring, the support structure extending in a substantially radial direction between the upper and lower planes and having non-uniform stiffness characteristics in a circumferential direction.

2. The blade bearing according to claim 1, wherein the support structure includes one or more portions of increased thickness to provide the non-uniform stiffness.

3. The blade bearing according to claim 1, wherein the inner ring is configured to mount to the blade and the outer ring is configured to mount to the hub.

4. The blade bearing according to claim 1, wherein the support structure extends radially inward around an entire circumference of the inner bearing ring.

5. The blade bearing according to claim 4, wherein the support structure substantially covers an opening defined by the inner ring.

6. The blade bearing according to claim 4, wherein the support structure is annular.

7. The blade bearing according to claim 1, wherein the support structure is secured to an inner radial surface of the inner ring.

8. The blade bearing according to claim 1, wherein the support structure and inner ring are secured to each other by a shrink fit, clamping, or a combination thereof.

9. The blade bearing according to claim 1, wherein the support structure and inner ring are secured to each other without bolts.

10. The blade bearing according to claim 1, wherein the support structure and inner ring comprise different materials.

11. The blade bearing according to claim 1, wherein the support structure includes bolt holes extending in an axial direction, and further wherein the inner ring is configured to be mounted to the blade via the bolt holes of the support structure.

12. The blade bearing according to claim 1, wherein the support structure has a periphery including first, second, third, and fourth portions, and wherein:
    the first and third portions are diametrically-opposite and have a first stiffness; and
    the second and fourth portions are diametrically-opposite and have a second stiffness less than the first stiffness.

13. The blade bearing according to claim 12, wherein the first and third portions are located at an angular distance of approximately 90° from the second and fourth portions, and wherein the support structure has a maximum stiffness at the first and third portions and minimal stiffness at the second and fourth portions.

14. A method of manufacturing a blade bearing for a wind turbine, comprising:
    forming inner and outer rings, one of the inner or outer bearing rings being configured to mount to a blade of the wind turbine and the other being configured to mount to a hub of the wind turbine;

securing a support structure to the inner ring before assembling the inner and outer rings together, wherein the support structure has a non-uniform stiffness;

machining a raceway surface on the inner ring after securing the support structure, the raceway surface being configured to support at least two rows of rolling elements;

arranging the rows of rolling elements on the raceway surface; and arranging the inner and outer rings next to each other so that the rows of rolling elements are held between the inner and outer rings.

15. The method according to claim 14, wherein the support structure is cast from a first material and the inner and outer rings are formed from a second material.

16. The method according to claim 14, wherein arranging the rows of rolling elements comprises arranging an upper row of the rolling elements in an upper plane and a lower row of the rolling elements in a lower plane, and further wherein the support structure extends in a substantially radial direction between the upper and lower planes.

\* \* \* \* \*